(12) United States Patent  (10) Patent No.: US 7,519,272 B2
Park  (45) Date of Patent: Apr. 14, 2009

(54) VIDEO AND AUDIO DATA RECORDING AND/OR REPRODUCING APPARATUS HAVING LOCK SETTING FUNCTION AND CONTROL METHOD THEREOF

(75) Inventor: Sang-wook Park, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 927 days.

(21) Appl. No.: 10/983,586

(22) Filed: Nov. 9, 2004

(65) Prior Publication Data

US 2006/0098946 A1    May 11, 2006

(51) Int. Cl.
 *H04N 5/76* (2006.01)
(52) U.S. Cl. .......................... 386/83; 386/68
(58) Field of Classification Search ............ 386/1, 386/45–46, 95–96, 125–126, 68, 8
See application file for complete search history.

(56) References Cited

U.S. PATENT DOCUMENTS 5,761,373 A * 6/1998 Yamamoto ............... 386/125
6,360,057 B1 * 3/2002 Tsumagari et al. ........ 386/95
7,187,846 B2 * 3/2007 Saito ......................... 386/69

FOREIGN PATENT DOCUMENTS

KR    1998-033861    8/1998
KR    10-0387125    5/2003

OTHER PUBLICATIONS

Korean Office Action issued on Sep. 28, 2006 with respect to Korean Application No. 10-2006-0018322, which corresponds to the above-referenced application.
Korean Office Action issued on Jun. 28, 2005.

* cited by examiner

*Primary Examiner*—Thai Tran
*Assistant Examiner*—Nigar Chowdhury
(74) *Attorney, Agent, or Firm*—Staas & Halsey LLP

(57) ABSTRACT

A video and audio recording and/or reproducing apparatus having a lock setting function and a control method thereof. The video and audio recording and/or reproducing apparatus records a video and audio file received from the outside on a storage device, and reproduces and outputs the recorded video and audio file to an external display. The apparatus includes an external input device receiving a function selection signal of the video and audio recording and/or reproducing apparatus, and a main controller displaying a lock setting list screen on the external display upon receiving a signal for setting a lock from the external input device. The main controller sets a lock setting information to prevent an area, on which a video and audio file selected from video and audio files listed on the lock setting list screen is recorded, from being overwritten by a video and audio file to be recorded.

21 Claims, 6 Drawing Sheets

FIG. 4

| | | TITLE | DATE | TIME | LOCK |
|---|---|---|---|---|---|
| LOCK SETTING | | | | | TOTAL |
| 1 | 〜 | ART | 2002.11.10 | 23:30 | OFF 🔓 |
| 2 | 🌲 | BEAR | 2002.11.10 | 23:40 | OFF 🔓 |
| 3 | ☁ | SCENE | 2002.12.20 | 12:00 | OFF 🔓 |
| 4 | ⛵ | ADVENTURE | 2002.12.22 | 18:20 | OFF 🔓 |
| INSTRUCTIONS | | ◊ MOVE  ↻ RETURN  ⎆ ENTER  [Menu] EXIT | | | |
| | | ◁◁ ▷▷ PRE.NEXT PAGE | | | | up_1

400

UP / MID / LOWER

FIG. 5

| | | TITLE | DATE | TIME | LOCK |
|---|---|---|---|---|---|
| LOCK SETTING | | | | | TOTAL |
| 1 | 〜 | ART | 2002.11.10 | 23:30 | ON 🔒 |
| 2 | 🌲 | PROGRAM LOCK | | | OFF 🔓 |
| 3 | ☁ | ENTER PASSWORD : | | | OFF 🔓 |
| 4 | ⛵ | ADVENTURE | 2002.12.22 | 18:20 | OFF 🔓 |
| INSTRUCTIONS | ◁✧▷ MOVE  ↻ RETURN  ⏎ ENTER  [Menu] EXIT  ◁◁ ▷▷ PRE.NEXT PAGE | | | | |

400, 500

UP / MID / LOWER

VIDEO AND AUDIO DATA RECORDING AND/OR REPRODUCING APPARATUS HAVING LOCK SETTING FUNCTION AND CONTROL METHOD THEREOF

BACKGROUND OF THE INVENTION

1. Field of the Invention

The present invention generally relates to a video and audio recording and/or reproducing apparatus having a lock setting function and a control method thereof. More specifically, the present invention concerns a video and audio recording and/or reproducing apparatus having a lock setting function capable of locking a video and audio file recorded on a storage device so as to prevent important files from being lost due to a lack of storage capacity while overwriting the file on a recording area, and a control method thereof.

2. Description of the Related Art

A video and audio recording and/or reproducing apparatus, which is capable of recording a broadcast signal and reproducing the recorded broadcast signal on and from a recording medium, has expanded its function with the development of digitization and compression technologies of the broadcast signal. Such a video and audio recording and/or reproducing apparatus is still under development so as to support various video sources such as the broadcast signal via a satellite and a cable, and network broadcasts via the Internet. To this end, the video and audio recording and/or reproducing apparatus employs a hard disc drive, which is a mass storage device, to record the video and audio signal carried by the various video sources.

The hard disc drive enables random access which can directly reach desired data using a data address, has a high data transfer rate, and enables writing of the largest amount of information. Thus, the hard disc drive is prevalently used as an auxiliary storage device.

The hard disc drive is configured to have a cluster structure used in a personal computer. In the personal computer storage technology, the cluster is a logical unit of file storage on the hard disc drive and is managed by an operating system (OS) of the computer. Any file stored on the hard disc drive takes up one or more clusters, and the largest file storage may take up several clusters.

When a single file is stored in several clusters, the clusters are not necessarily next to each other and may be rather widely scattered over the hard disc drive. A file allocation table (FAT) manages a location of the clusters associated with the single file, which are stored in a certain area on the hard disc drive. The FAT records the clusters storing the file on the hard disc drive, the sequential order of the clusters storing the single file, and status information on the clusters.

The video and audio recording and/or reproducing apparatus employing such a storage device facilitates the recording and the management of the video and audio file supported from the various video sources.

When recording a file on the hard disc drive, a conventional video and/or audio recording and/or reproducing apparatus compares capacity of the hard disc drive with that of the file and determines whether the latter exceeds the former. If so, the video and audio recording and/or reproducing apparatus determines whether an overwrite function, which overwrites the file on the used recording area, is set. If not, the video and audio recording and/or reproducing apparatus outputs an error message indicating that the file recording is impossible due to the lack of the recording area.

If the overwrite function is set, the video and audio file is overwritten on the recording area of the hard disc drive in a sequential order according to FIFO (first-in, first-out) or LIFO (last-in, first-out).

However, the conventional video and audio recording and/or reproducing apparatus may lose important files when the file is overwritten on the recording area in sequence automatically depending on the setting of the overwrite function if the entire recording area of the hard disc drive is occupied and the storage capacity is not sufficient. In other words, undesired files may be deleted due to the overwriting.

SUMMARY OF THE INVENTION

Accordingly, it is an aspect of the present invention to overcome the foregoing and/or other disadvantages of the conventional apparatus.

Additional aspects and/or advantages of the invention will be set forth in part in the description which follows and, in part, will be obvious from the description, or may be learned by practice of the invention.

To overcome the above and/or other disadvantages, there is provided a video and audio recording and/or reproducing apparatus to record a video and audio file received from an outside on a storage device, and to reproduce and output the recorded video and audio file to an external display. The video and audio recording and/or reproducing apparatus includes an external input device to receive a function selection signal of the video and audio recording and/or reproducing apparatus, and a main controller to display a lock setting list screen on the external display upon receiving a signal to set a lock from the external input device, and to set a lock setting information to prevent a first area of the storage device, on which the recorded video and audio file is recorded, from being overwritten by a video and audio file to be recorded, the recorded video and audio file being selected from a plurality of video and audio files listed on the lock setting list screen.

The lock setting information is recorded on an area on which additional information on the video and audio file to be recorded in the storage device is recorded.

The main controller checks a remaining recording capacity of the storage device upon receiving from the external input device a recording request signal, and if the recording capacity is below a capacity of the video and audio file to be recorded, the main controller processes to thereby overwrite the video and audio file on an area in sequence, excluding the area on which the locked video and audio file is recorded.

The storage device may be a hard disc drive. The lock setting list screen displays a list of the video and audio files recorded on the storage device and a lock setting item to select whether to lock or unlock the video and audio files respectively.

The foregoing and/or other aspects may also be achieved by providing a control method of a video and audio recording and/or reproducing apparatus to record a video and audio file received from an outside on a storage device, and to reproduce and output the recorded video and audio file to an external display, the method including displaying a lock setting list screen through the external display upon receiving a lock setting request signal to lock at least one video and audio file among video and audio files recorded on the storage device, and setting a lock setting information to prevent an area of the storage device, on which a selected one of the recorded video and audio files which is also listed on the lock setting list screen is recorded, from being overwritten by a video and audio file to be recorded.

The control method further includes checking a remaining recording capacity of the storage device upon receiving a record request signal to record the video and audio file on the storage device, determining whether a recording mode of the storage device is an overwrite mode when it is determined that the recording capacity remaining on the storage device is below a capacity of the video and audio file to be recorded, and overwriting the video and audio file on a second area of the storage device in sequence excluding the area of the storage device on which the locked video and audio file is recorded when it is determined that the recording mode is the overwrite mode.

The lock setting information is recorded on an area on which additional information on the video and audio file recorded on a data area of the storage device is recorded. The lock setting list screen displays a list of the video and audio files recorded on the storage device and a lock setting item to select whether to lock or unlock the video and audio files respectively.

BRIEF DESCRIPTION OF THE DRAWINGS

These and/or other aspects and advantages of the invention will become apparent and more readily appreciated from the following description of the exemplary embodiment, taken in conjunction with the accompanying drawing figures of which:

FIG. 4 illustrates a lock setting list screen displayed on the display when a lock setting request signal is received through the light receiver of FIG. 2;

FIG. 5 illustrates a password menu screen is displayed when a lock setting signal is selected with respect to one of a program file list displayed on the lock setting list screen of FIG. 4.

DETAILED DESCRIPTION OF THE PREFERRED EMBODIMENT

Figure 1:
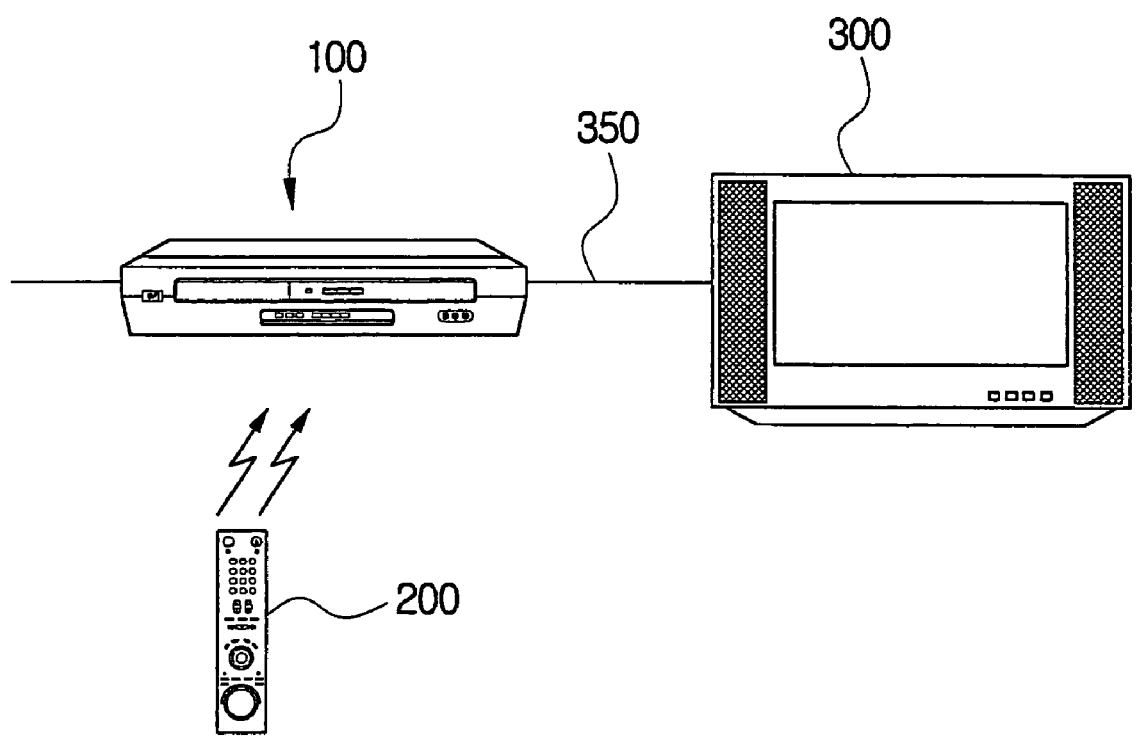
FIG. 1 illustrates a display system employing a video and audio recording and/or reproducing apparatus having a lock setting function according to an exemplary embodiment of the present invention.

Reference will now be made in detail to the embodiment of the present invention, an example of which is illustrated in the accompanying drawings, wherein like reference numerals refer to the like elements throughout. The embodiment is described below in order to explain the present invention by referring to the drawings.

FIG. 1 is a schematic of a display system employing a video and audio recording and/or reproducing apparatus having a lock setting function according to an exemplary embodiment of the present invention.

Referring to FIG. 1, the video and audio recording and/or reproducing apparatus 100 is connected with a television, or TV 300 through a transmission cable 350.

The video and audio recording and/or reproducing apparatus 100 processes a signal received from an external input device such as a remote controller 200, and transfers display information to the TV 300. The external input device is not limited to the remote controller 200 emitting a radio signal, but may be any of other various input devices, such as a wired keyboard.

The video and audio recording and/or reproducing apparatus 100 is configured and constructed to receive one or more video and audio signals provided from several video and audio sources. The video source may include media capable of transferring a signal, for example, terrestrial television broadcasts, satellite broadcasts, cable drop lines, computer wires, and model wires.

Figure 2:
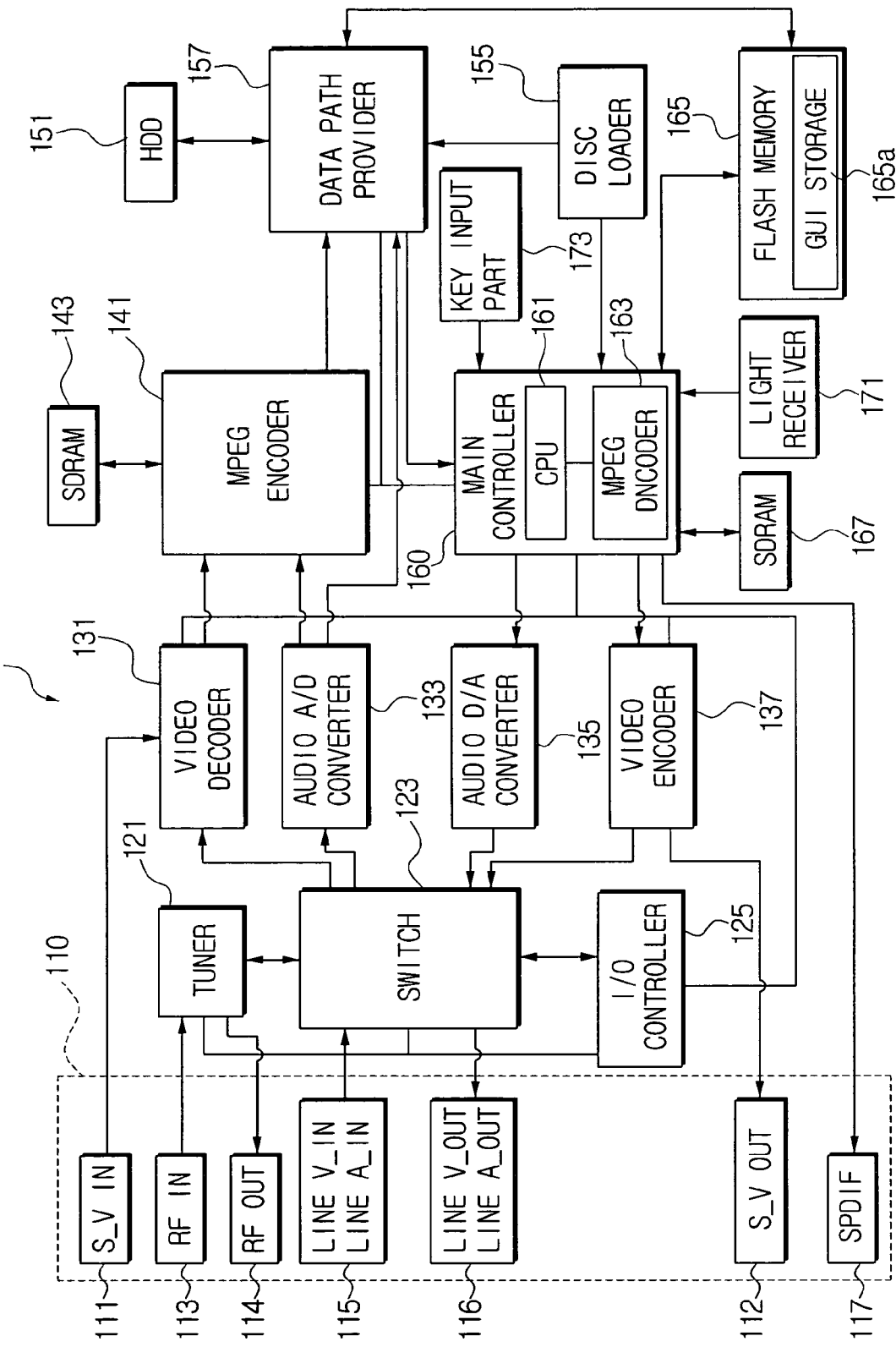
FIG. 2 is a block diagram of the video and audio recording and/or reproducing apparatus of FIG. 1.

FIG. 2 depicts a block diagram of the video and audio recording and/or reproducing apparatus 100 according to an exemplary embodiment of the present invention.

Referring to FIG. 2, the video and audio recording and/or reproducing apparatus 100 includes input and output (I/O) terminals 110, a tuner 121, a switch 123, an I/O controller 125, an MPEG encoder 141, a hard disc drive (HDD) 151, a disc loader 155, and a main controller 160.

The I/O terminals 110 receive a signal generated from various video signal sources, and outputs the received signal or a signal reproduced from the HDD 151 which is used as the mass storage device.

The I/O terminals 110 include super video input terminal (S_V IN) 111 and output terminal (S_V OUT) 112, radio frequency input terminal (RF IN) 113 and output terminal (RF OUT) 114, line video and audio input terminal (LINE V_IN and LINE A_IN) 115 and output terminal (LINE V_OUT and LINE A_OUT) 116, and a digital audio signal output terminal SPDIF (serial parallel digital interface) 117.

The S_V IN 111 receives a luminance signal Y (not shown) and color difference signals Cr and Cb (not shown), which are digital and separated from each other, and is used in connection with, for example, a digital camcorder, a DVD player, or a set-top box. The S_V OUT 112 transfers the luminance signal Y and the color difference signals Cr and Cb to the TV 300. The RF IN 113 receives a terrestrial broadcast signal and is generally connected to an antenna. The RF OUT 114 transfers a broadcast signal tuned by the tuner 121, to be explained below, to an outside, and is generally connected to the TV 300. The LINE V_IN and LINE A_IN 115 receives an analog signal having the luminance signal Y and a color signal that are mixed, and is connected with the TV 300 supporting the display of the analog video signal.

The SPDIF 117 outputs to the outside a digital audio signal transferred from the main controller 160. The tuner 121 controls to receive a broadcast signal of a channel requested from the I/O controller 125 controlled by the main controller 160 through the RF IN 113. The switch 123 controls to selectively connect the I/O terminals 110 to each other, which are connected to the switch 123 under the control of the I/O controller 125. The I/O controller 125 controls the tuner 121 and the switch 123 under the control of the main controller 160.

A video decoder 131 is controlled by the main controller 160, and decodes and outputs the signal received through the S_V IN 111 or the switch 123. An audio analog-to-digital (A/D) converter 133 converts the analog audio signal input via the switch 123 to a digital signal, and outputs the converted digital signal to the MPEG encoder 141. An audio digital-to-analog (D/A) converter 135 converts a digital audio signal output from an MPEG decoder 163 under control of the main controller 160 to an analog audio signal, and outputs the converted analog signal to the switch 123. A video encoder 137 encodes a video signal output from the video decoder 131 or the MPEG decoder 163, and outputs the encoded signal to the switch 123.

The MPEG encoder 141 encodes, under control of the main controller 160, the audio signal output from the audio A/D converter 133 and the video signal output from the video decoder 131 according to a predetermined compression format, and stores data to be recorded on the HDD 151. Advantageously, the MPEG encoder 141 encodes the video signal according to MPEG-2 compression.

A SDRAM (synchronous dynamic random access memory) 143 is used for the encoding of the MPEG encoder 141.

The disc loader 155 is embedded in the video and audio recording and/or reproducing apparatus 100. The disc loader 155 may be a DVD (digital versatile disc) player loading the recorded data from a DVD or a CD (compact disc) to be reproduced.

The disc loader 155 records and reproduces the video and audio signals on and from the DVD or the CD under the control of the main controller 160.

A data path provider 157 provides a transmission path for the data recorded on the HDD 151 and for the data recorded on a disc inserted into the disc loader 155, under control of the main controller 160. When the data on the disc of the disc loader 155 is to be recorded on the HDD 151, or, the data on the HDD 151 is to be recorded on the disc inserted in the disc loader 155, the data path provider 157 provides the data path between the HDD 151 and the disc loader 155 under control of the main controller 160. The data path provider 157 further provides a data path when the encoded data of the MPEG encoder 141 is to be recorded on the HDD 151.

A light receiver 171, which is applied as an interface, receives a user's operation signal emitted from the remote controller 200, and outputs the received signal to the main controller 160.

A key input part 173 includes a plurality of function keys (not shown) to select functions supported by the video and audio recording and/or reproducing apparatus 100 or generating a command for the function execution to the main controller 160.

The main controller 160 processes the user's operation signal received through the light receiver 171, and controls the respective parts. The main controller 160 includes a CPU (central processing unit) 161 and the MPEG decoder 163, which decodes the compressed signal according to MPEG standards. The main controller 160 is implemented in this exemplary embodiment as an integrated circuit (IC) of a single chip having the CPU 161 and the MPEG decoder 163. However, it should be appreciated that the MPEG decoder 163 may be separately attached to another chip and connected to the main controller 160. The main controller 160 displays a lock setting list screen to enable the user to select whether to lock or unlock the video and audio files recorded on the HDD 151, according to a lock setting request signal received through the light receiver 171.

A flash memory 165 contains programs relating to the function execution of the main controller 160. For example, the flash memory 165 includes a GUI (graphic user interface) storage 165a which contains a program to process the lock setting list screen to a GUI screen. The main controller 160 generates the lock setting list screen and a password menu screen as the GUI screen based on the program stored in the GUI storage 165a, thus providing convenience to the user. The generated GUI screen is displayed on the TV 300.

A SDRAM 167 is a temporary storage used for the main controller 160. When the video and audio recording and/or reproducing apparatus 100 starts, the main controller 160 processes the support functions depending on the signal incoming through the light receiver 171 from the remote controller 200, by loading the operating program contained in the flash memory 165.

The following descriptions are made on the lock setting function which is set with respect to a video and audio file so as to manage the video and audio files recorded on the HDD 151. In this exemplary embodiment of the present invention, the video and audio file is referred to as a program file.

A certain program file is locked to prevent the certain program file from being overwritten by a file to be recorded when the recording file is to be overwritten on an occupied recording area due to the lack of the recording capacity of the HDD 151.

Figure 3:
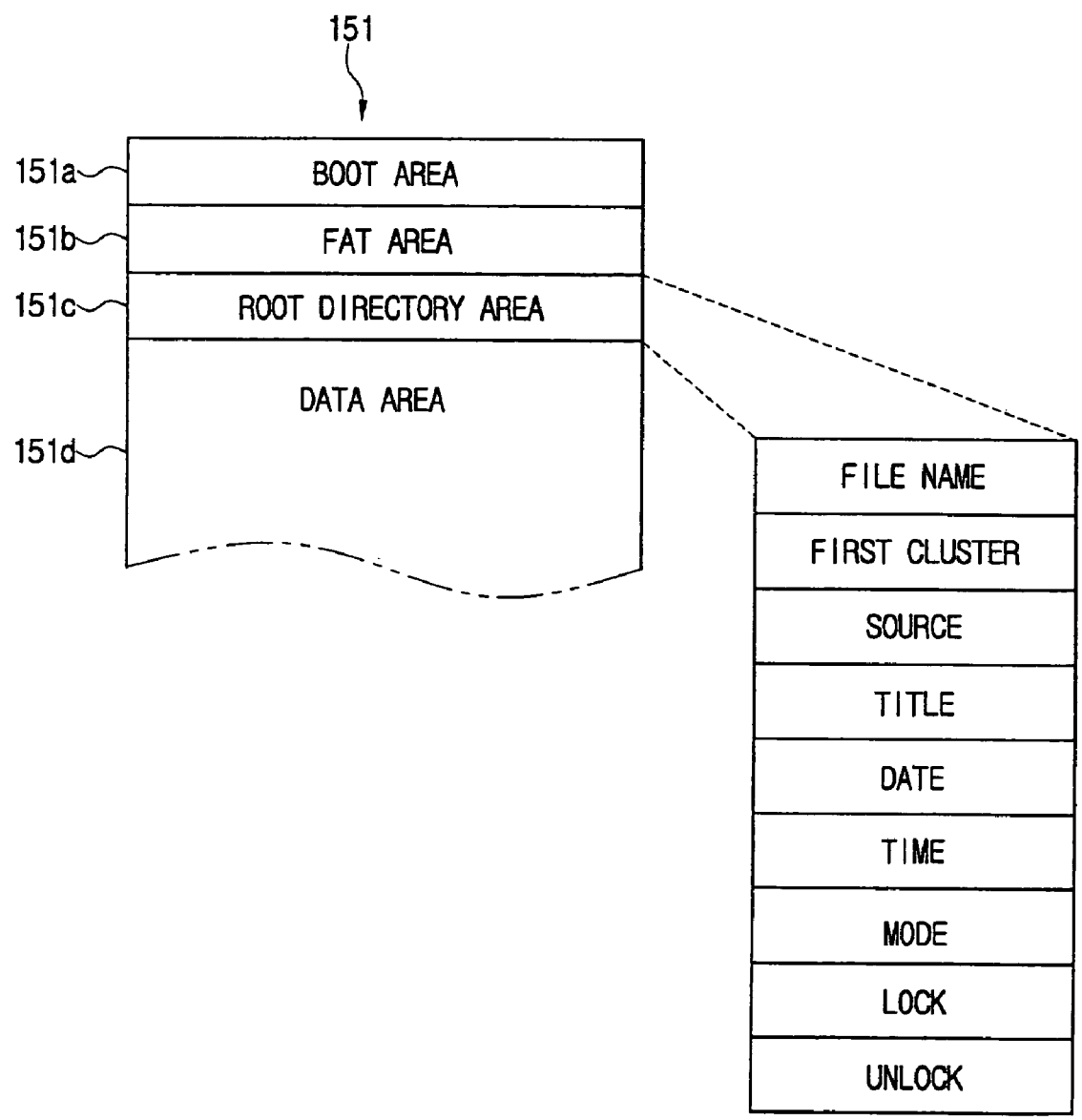
FIG. 3 illustrates exemplary divisions of the hard disc drive of FIG. 2.

Referring to FIG. 3, area on the HDD 151 is divided into a boot area 151a, a FAT area 151b, a root directory area 151c, and a data area 151d.

The HDD 151 generally has a cluster structure used in a personal computer. The cluster is a unit of a disc place allocated by the operating system (OS). A file recorded on the HDD 151 takes up at least one cluster, and a large file may take up several clusters.

The boot area 151a is divided into a master boot sector and a DOS boot sector (not shown). The master boot sector contains information on the partition of the HDD 151, and the DOS boot sector contains information for booting the OS, such as capacities of a FAT (file allocation table) and the HDD 151.

The FAT area 151b contains a file system, specifically, contains cluster location information and cluster status information. The cluster location information relates to clusters of the FAT area 151b on which the program file is recorded and the order in which the program file is recorded. The cluster status information includes information on an unused cluster, a defective cluster, and a last cluster.

The root directory area 151c contains first cluster information, file capacity information, and additional information on the file. The additional information contains a file name, a title information, a source information, a date information of the file recording (year/month/day), a recording time information (hour/minute/second), a mode information, a lock setting information, and an unlock information with respect to the program file recorded on the respective clusters. The additional information on the file of the root directory area 151c is updated each time the recorded file is edited.

The data area 151d substantially contains the program file, concretely, a music file, a still image file, and a moving picture file.

When a program file is recorded on the data area 151d, the HDD 151 assigns an address for the program file to an unused cluster based on the information contained in the FAT area 151b and thus, records the program file on the cluster. The additional information on the program file is recorded on the root directory area 151c.

When seeking the program file recorded on the data area 151d, the HDD 151 reaches directly to the related cluster of the data area 151d and reads the desired program file. The following is the lock setting operation with respect to the program file recorded on the HDD 151. Upon receiving the lock setting request signal through the light receiver 171, the main controller 160 processes to display a lock setting list screen on the TV 300. The TV 300 displays the lock setting list screen 400 as shown in FIG. 4. Referring to FIG. 4, the lock setting list screen 400 is divided into an upper area, a mid area, and a lower area.

"Lock Setting" is indicated in a first block up_1 of the upper area, which shows the lock setting list screen 400. The mid area indicates a guide information of the program files recorded on the HDD 151, to be locked. The lower area indicates information on how to operate the keys of the remote controller 200 in correspondence with the usage of the lock setting list screen 400.

The program guide information is organized based on the additional information on file recorded on the root directory area 151c of the HDD 151. Upon receiving the lock setting request signal through the light receiver 171, the main controller 160 generates the lock setting list screen 400 by use of the additional information recorded on the root directory area 151c of the HDD 151.

The program files can be managed by the item by placing a cursor on the program guide information listed on the mid area and operating certain keys. According to an exemplary embodiment of the present invention, the cursor is placed on the lock setting item in the program guide information listed on the mid area so as to set the lock. The user places the cursor on the lock setting item of the program file to be locked and locks the desired program file through the key operation. It is advantageous that information indicated in the lock setting item is defaulted to "OFF", which denotes that the program file is unlocked, as shown in FIG. 4. It should be understood that the user can change the information in the lock setting item.

When the user selects "ON" in the lock setting item to lock the program file, the main controller 160 processes to display a menu screen to enter the password. For example, the lock setting item is set to "ON" in relation to the "Art" program file, and the main controller 160 processes to overlap a password menu screen 500 of FIG. 5 on a certain area of the lock setting list screen 400. If the password input through the remote controller 200 is identical with a predetermined password, the main controller 160 processes to record the updated lock setting information on the HDD 151 and to indicate a lock mark denoting that the "Art" program file is locked. The updated lock setting information is transferred to the HDD 151 and recorded on the root directory area 151c. As a result, the lock setting information of the root directory area 151c is updated. Other program files may be locked in the same manner.

If the HDD 151 lacks the capacity for recording and the program file should be overwritten on the occupied recording area, the main controller 160 processes not to delete the locked program file.

In order to record the program file on the HDD 151, the main controller 160 checks the remaining recording capacity of the HDD 151 upon receiving a file recording request signal through the light receiver 171. The remaining recording capacity of the HDD 151 can be obtained based on the cluster status information of the FAT area 151b, that is, based on the number of unused clusters.

The main controller 160 compares the remaining recording capacity of the HDD 151 with the capacity of the program file to be recorded. If the former is greater than the latter, the main controller 160 transfers the program file to be recorded to the HDD 151 via the data path provider 157. The transferred program file is recorded on the cluster allocated by the file system, and the additional information on the recorded program file is recorded on the root directory area 151c.

If the remaining recording capacity of the HDD 151 is below the capacity of the program file to be recorded, the main controller 160 determines whether a recording mode of the HDD 151 is an overwrite mode. If so, the main controller 160 processes to delete the program files recorded on the HDD 151 in a certain order. The deletion may be performed according to FIFO (first-in, first-out) or LIFO (last-in, first-out). The FIFO deletes the oldest program file first, and the LIFO deletes the most recently recorded program file first.

The deletion of the recorded program files of the HDD 151 represents that the cluster information of the program file is deleted from the FAT area 151b. Meanwhile, the program file recorded on the data area 151d is not deleted but remains.

When the recording mode of the HDD 151 is the overwrite mode, the cluster location information of the FAT area 151b is deleted in sequence according to FIFO or LIFO. When deleting the location information under control of the main controller 160, the HDD 151 does not delete the information of the locked cluster by checking the additional information contained in the root directory area 151c.

A new address is assigned to the deleted cluster information so that the HDD 151 records the program file input through the data path provider 157 on the data area 151d. At this time, the information on the program file to be recorded is recorded on the root directory area 151c, and the substantial program file is recorded on the data area 151d. As above, the overwriting is performed in a manner that the pre-recorded program file is deleted and the new program file is recorded instead. The main controller 151 processes to skip the area on which the locked program file is recorded.

Figure 6:
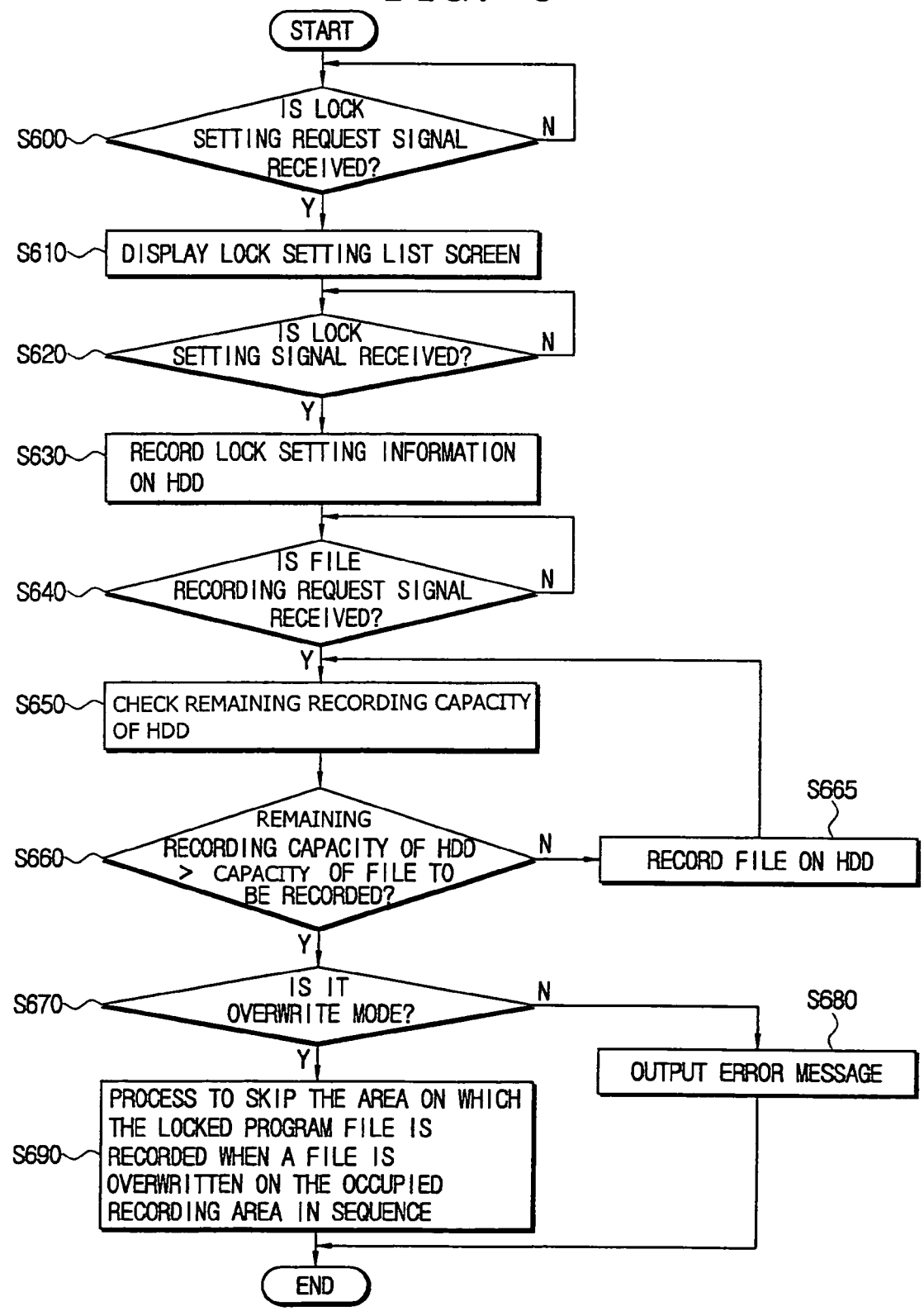
FIG. 6 is a flowchart of a control method of the video and audio recording and/or reproducing apparatus having the lock setting function of FIG. 2.

A control method of the video and audio recording and/or reproducing apparatus 100 having the lock setting function is explained below with reference to FIG. 6.

When the video and audio recording and/or reproducing apparatus 100 is powered, the main controller 160 determines whether the lock setting request signal is received through the light receiver 171 at operation S600. If so, the main controller 160 processes to display the lock setting list screen 400 on the TV 300 as shown in FIG. 4 at operation S610. When a lock setting signal is received with respect to at least one program file of the program guide information listed in the lock setting list screen 400 at operation S620, the main controller 160 records the lock setting information on the HDD 151 at operation S630 and processes to update the additional information of the program file recorded on the root directory area 151c.

When the file recording request signal is received through the light receiver 171 at operation S640, the main controller 160 checks the capacity of the remaining recording area on the data area 151d of the HDD 151 at operation S650. The main controller 160 compares the remaining recording capacity of the HDD 151 with the capacity of the program file to be recorded at operation S660.

If the remaining recording capacity of the HDD 151 is above the capacity of the program file to be recorded according to the comparison at operation S660, the main controller 160 processes to record the program file on the unused cluster of the HDD 151 at operation S665, and repeats the operation S650. If the former is less than the latter at operation S660, the main controller 160 determines whether the recording mode of the HDD 151 is the overwrite mode at operation S670.

If the recording mode of the HDD 151 is not the overwrite mode, the main controller 160 does not perform the recording operation but displays on the TV 300 the error message indicating the program file cannot be recorded due to the lack of the recording capacity of the HDD 151 at operation S680.

If the recording mode is the overwrite mode, the main controller 160 processes to overwrite the program file on the occupied data area 151d in the certain sequential order while the area of the locked program file is skipped at operation S690.

In this exemplary embodiment of the present invention, the desired program file is locked to prevent the file from being deleted due to the lack of recording capacity by seeking the recorded program file in advance when the overwrite is performed. However, the lock setting may be performed after the recording capacity is exceeded and before the overwrite is performed.

In light of the foregoing, the video and audio recording and/or reproducing apparatus having the lock setting function and the control method thereof is capable of preventing an important program file from being lost. To this end, the program file to be preserved is locked, the pre-recorded program file is deleted due to the lack of the recording capacity of the storage device, and the new program file is overwritten instead while the locked program file is skipped.

Although an embodiment of the present invention has been shown and described, it would be appreciated by those skilled in the art that changes may be made in this embodiment without departing from the principles and spirit of the invention, the scope of which is defined in the claims and their equivalents.

What is claimed is:

1. A video and audio recording and/or reproducing apparatus to record a video and audio file received from an outside on a storage device, and to reproduce and output the recorded video and audio file to an external display, the video and audio recording and/or reproducing apparatus comprising:
   an external input device to receive a function selection signal of the video and audio recording and/or reproducing apparatus; and
   a main controller to display a lock setting list screen on the external display upon receiving a signal to set a lock from the external input device, and to set a lock setting information to prevent a first area of the storage device, on which the recorded video and audio file is recorded, from being overwritten by a video and audio file to be recorded, the recorded video and audio file being selected from a plurality of video and audio files listed on the lock setting list screen,
   the setting of the lock setting information being performed after a remaining recording capacity of the storage device is less than a capacity of the video and audio file to be recorded.

2. The video and audio recording and/or reproducing apparatus of claim 1, wherein the lock setting information is recorded on a second area of the storage device on which information on the video and audio file to be recorded is recorded.

3. The video and audio recording and/or reproducing apparatus of claim 1, wherein the main controller checks the remaining recording capacity of the storage device upon receiving from the external input device a recording request signal, and if the checked recording capacity is less than the capacity of the video and audio file to be recorded, the main controller processes to respectively overwrite the plurality of video and audio files on an area of the storage device in sequence excluding the first area.

4. The video and audio recording and/or reproducing apparatus of claim 3, wherein the storage device comprises:
   a file allocation table (FAT) area,
   a boot area comprising capacities of the FAT area; and
   a root directory area comprising information on the remaining recording capacity.

5. The video and audio recording and/or reproducing apparatus of claim 1, wherein the storage device is a hard disc drive.

6. The video and audio recording and/or reproducing apparatus of claim 5, wherein the hard disc drive comprises a plurality of clusters.

7. The video and audio recording and/or reproducing apparatus of claim 6, wherein a remaining recording capacity of the hard disc drive is determined based on a number of the clusters which are unused.

8. The video and audio recording and/or reproducing apparatus of claim 1, wherein the lock setting list screen displays a list of the plurality of video and audio files and a lock setting item to select whether to respectively lock or unlock the plurality of video and audio files.

9. The video and audio recording and/or reproducing apparatus of claim 1, wherein the external input device is a remote controller or a keyboard.

10. The video and audio recording and/or reproducing apparatus of claim 1, wherein the external input device comprises a plurality of input/output (I/O) terminals, each of the I/O terminals comprising:
    a super video input terminal (S_V IN) to receive a luminance signal and a color difference signal; and
    a super video output signal (S_V OUT) to transfer the received luminance signal and color difference signals to the external display.

11. The video and audio recording and/or reproducing apparatus of claim 10 wherein the I/O terminals each further comprise a switch to receive an analog signal having the luminance signal and a color signal, the apparatus further comprising:
    an audio A/D converter to convert the received analog signal to a digital signal; and
    an MPEG encoder to receive the digital signal and encode the received digital signal under a control of the main controller.

12. The video and audio recording and/or reproducing apparatus of claim 11, wherein the main controller comprises:
    an MPEG decoder to receive the encoded signal from the MPEG encoder and decode the received signal; and
    a CPU to control the MPEG decoder.

13. The video and audio recording and/or reproducing apparatus of claim 1, wherein the external display is a television.

14. The video and audio recording and/or reproducing apparatus of claim 13, further comprising a video decoder controlled by the main controller to decode the signals received by the S_V IN.

15. The video and audio recording and/or reproducing apparatus of claim 1, further comprising:
    a flash memory comprising a program relating to a function execution of the main controller.

16. The video and audio recording and/or reproducing apparatus of claim 15, wherein the program is a graphical user interface storage.

17. A control method of a video and audio recording and/or reproducing apparatus to record a video and audio file received from an outside on a storage device, and reproduce and output the recorded video and audio file to an external display, the control method comprising:
    displaying a lock setting list screen through the external display upon receiving a lock setting request signal to lock at least one video and audio file among video and audio files recorded on the storage device; and
    setting a lock setting information to prevent an area of the storage device, on which a selected one of the recorded video and audio files which is also listed on the lock setting list screen, from being overwritten by a video and audio file to be recorded, the setting of the lock setting information being after a remaining recording capacity of the storage device is less than a capacity of the video and audio file to be recorded.

18. The control method of claim 17, further comprising:

checking a remaining recording capacity of the storage device upon receiving a record request signal to record the video and audio file on the storage device;

determining whether a recording mode of the storage device is an overwrite mode when it is determined that the recording capacity remaining on the storage device is below the capacity of the video and audio file to be recorded; and overwriting the video and audio file on a second area of the storage device in sequence excluding the area of the storage device on which the locked video and audio file is recorded when it is determined that the recording mode is the overwrite mode.

19. The control method of claim 17, wherein the setting of the lock setting information comprises recording the lock setting information on an area of the storage device on which information on the recorded video and audio file is recorded.

20. The control method of claim 17, further comprising displaying the listed video and audio files and a lock setting item to select whether respectively to lock or unlock the video and audio files.

21. A method comprising:

recording a plurality of video and audio files on a storage device;

selecting at least one of the recorded files as a locked file; and recording an additional video and audio file on the storage device comprising skipping an area of the storage device where the selected file is stored, wherein the skipping the area comprises determining whether a capacity of the additional file is greater than a remaining capacity of the storage device, setting the area to be skipped, and deleting an unselected one of the recorded files if determined that the capacity of the additional file is greater than the remaining capacity, the setting the area to be skipped being after the determining that the capacity of the additional file is greater than the remaining capacity.

\* \* \* \* \*

UNITED STATES PATENT AND TRADEMARK OFFICE
CERTIFICATE OF CORRECTION

| | | |
|---|---|---|
| PATENT NO. | : 7,519,272 B2 | Page 1 of 1 |
| APPLICATION NO. | : 10/983586 | |
| DATED | : April 14, 2009 | |
| INVENTOR(S) | : Sang-wook Park | |

It is certified that error appears in the above-identified patent and that said Letters Patent is hereby corrected as shown below:

Column 9, Line 58, change "area," to --area;--.

Column 10, Line 24, change "claim 10" to --claim 10,--.

Signed and Sealed this

Seventh Day of July, 2009

JOHN DOLL
*Acting Director of the United States Patent and Trademark Office*